United States Patent
Crabtree et al.

(10) Patent No.: US 11,271,838 B2
(45) Date of Patent: Mar. 8, 2022

(54) TIMING SYNCHRONIZATION

(71) Applicant: INTERNATIONAL BUSINESS MACHINES CORPORATION, Armonk, NY (US)

(72) Inventors: Donald Crabtree, Port Ewen, NY (US); Richard K. Errickson, Poughkeepsie, NY (US); John S. Houston, Hopewell Junction, NY (US); Peter K. Szwed, Rhinebeck, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 290 days.

(21) Appl. No.: 15/406,199

(22) Filed: Jan. 13, 2017

(65) Prior Publication Data
US 2018/0205479 A1 Jul. 19, 2018

(51) Int. Cl.
*G06F 15/16* (2006.01)
*H04L 43/0852* (2022.01)
*H04J 3/06* (2006.01)

(52) U.S. Cl.
CPC ........ *H04L 43/0858* (2013.01); *H04J 3/0667* (2013.01)

(58) Field of Classification Search
CPC ..... H04J 3/0661; H04J 3/0667; H04L 43/067; H04L 43/667; H04L 43/0858; H04L 43/661
USPC .................................................. 709/248, 243
See application file for complete search history.

(56) References Cited

U.S. PATENT DOCUMENTS

| 7,496,686 | B2 | 2/2009 | Coyle |
| 7,693,082 | B2 | 4/2010 | Wright |
| 8,949,468 | B2 | 2/2015 | Carlson et al. |
| 2006/0184949 | A1 | 8/2006 | Craddock et al. |
| 2009/0190613 | A1* | 7/2009 | Finn ...................... H04J 3/0697 370/509 |

(Continued)

OTHER PUBLICATIONS

Weibel, Hans, "IEEE 1588 Standards for a Precision Clock Synchronization Protocol and Synchronous Ethernet", Nov. 29, 2012.*

(Continued)

*Primary Examiner* — Melvin H Pollack
*Assistant Examiner* — Messeret F Gebre
(74) *Attorney, Agent, or Firm* — Cantor Colburn LLP; Edward Wixted

(57) ABSTRACT

Embodiments include method, systems and computer program products for timing synchronization. Aspects include sending to a remote system a first base packet, the first base packet is sent at a first send event time and then recording the first send event time in a memory. Aspects also include sending to the remote system a second base packet, wherein the payload comprises instructions for the remote computing system and receiving a first remote packet, wherein a payload comprises a first received time indicating a time the first base packet was received. Aspects then include recording the first received time and recording a second received time, wherein the second received time indicates a time the first remote packet was received by the base system. Aspects include receiving a second remote packet, wherein a payload comprises a second sent time indicating a time the first remote packet was sent.

17 Claims, 5 Drawing Sheets

(56) References Cited

U.S. PATENT DOCUMENTS

| | | | | |
|---|---|---|---|---|
| 2010/0103923 | A1* | 4/2010 | Nosley | H04W 72/005 370/350 |
| 2010/0150117 | A1* | 6/2010 | Aweya | G01S 5/14 370/338 |
| 2011/0051754 | A1* | 3/2011 | Lansdowne | H04J 3/0673 370/503 |
| 2013/0100832 | A1* | 4/2013 | Flinn | H04L 43/0852 370/252 |
| 2015/0103836 | A1* | 4/2015 | Chandhoke | H04L 12/4666 370/401 |
| 2015/0358700 | A1* | 12/2015 | Lee | H04J 3/0673 398/53 |
| 2016/0191184 | A1* | 6/2016 | Hsueh | H04L 63/0428 370/503 |
| 2019/0245690 | A1* | 8/2019 | Shah | H04L 9/3242 |

OTHER PUBLICATIONS

L. Gun and H. Feijiang, "Precise two way time synchronization for distributed satellite system," 2009 IEEE International Frequency Control Symposium Joint with the 22nd European Frequency and Time forum, 2009, pp. 1122-1126 (Year: 2009).*

Wang, T., Zhou, W., Zhao, D., & Zhao, S. (2012). Exponential synchronization analysis and control for discrete-time uncertain delay complex networks with stochastic effects. Mathematical Problems in Engineering, , 261274 (14 pp.). (Year: 2012).*

B. Zhao, J. Ji, M. Zhang and P. Zhai, "Reseach of Time Synchronization Algorithm Based on IEEE1588 in Electric Power System," 2012 International Conference on Control Engineering and Communication Technology, 2012, pp. 1006-1009 (Year: 2012).*

R. Cochran, C. Marinescu and C. Riesch, "Synchronizing the Linux system time to a PTP hardware clock," 2011 IEEE International Symposium on Precision Clock Synchronization for Measurement, Control and Communication, 2011, pp. 87-92 (Year: 2011).*

Mitchell, Christopher R., "Building Fast, CPU-Efficient Distributed Systems on Ultra-Low Latency, RDMA—Capable Networks", https://www.cs.nyu.edu/media/publications/mitchell_christopher.pdf, 2015, pp. 1-98.

Shi et al., "Research on Timestamp Synchronization for Network Confrontation", http://ieeexplore.ieee.org/document/5601298/, (2010), pp. 1-4.

* cited by examiner

TIMING SYNCHRONIZATION

BACKGROUND

The present disclosure relates to timing synchronization, and more specifically, to methods, systems, and computer program products for timing synchronization using completion timestamps.

Computer servers in a network system have been configured to maintain time-of-day (TOD) synchronization. The computer servers utilize the time-of-day synchronization for determining a time sequence when tasks are completed by the computer servers. Tracking the order that tasks are completed is useful for restoring corrupted or lost files, for example.

To obtain time-of-day synchronization, computer servers have exchanged time stamps determining by a time-of-day clock with one another. For this methodology, a software program on a first computer that accesses a time-of-day time stamp value from the time-of-day clock on the first computer may not be able to immediately generate a message containing the time stamp value when the computer is operating near a maximum processing capacity with other tasks. Further, the actual creation and sending of a packet takes time making it difficult to correctly reflect the precise send time within the packet being sent. Thus, when a message is transmitted from the first computer to a second computer, the send time stamp value may not accurately indicate the actual time that the message was transmitted. Further, there exists a transmission time period for the message to be transmitted from the first computer to the second computer that may vary.

SUMMARY

Embodiments include a computer system for timing synchronization between a base computing system and a remote computing system, the base computing system including a processor communicatively coupled to a memory, the processor configured to send to the remote computing system a first base packet, wherein the first base packet is sent at a first send event time and then record the first send event time in the memory. The processor is further configured to send to the remote computing system a second base packet, wherein a payload of the base packet comprises instructions for the remote computing system. Then the processes is configured to receive, from the remote computing system, a first remote packet, wherein a payload of the first remote packet comprises a first received event time indicating a time the first base packet was received by the remote computing system and record the first received event time in the memory. And also record a second received event time in the memory, wherein the second received event time indicates a time the first remote packet was received by the base computing system. Next, the processor is further configured to receive, from the remote computing system, a second remote packet, wherein a payload of the second remote packet comprises a second send event time indicating a time the first remote packet was sent by the remote computing system and calculate a transmission time value based on the first send event time, the second send event time, the first received event time, and the second received event time.

Embodiments also include a computer program product for timing synchronization between a base computing system and a remote computing system, the computer program product including a computer readable storage medium having computer readable program code embodied therewith. The computer readable program code including computer readable program code configured to perform a method. The method sending, by the base computing system, to the remote computing system a first base packet, wherein the first base packet is sent at a first send event time. Then, the method includes recording, by the base computing system, the first send event time in a memory. Next, the method includes sending, by the base computing system, to the remote computing system a second base packet, wherein a payload of the base packet comprises instructions for the remote computing system. The method also includes receiving, from the remote computing system, a first remote packet, wherein a payload of the first remote packet comprises a first received event time indicating a time the first base packet was received by the remote computing system. The method includes recording, by the base computing system, the first received event time in the memory and recording, by the base computing system, a second received event time in the memory, wherein the second received event time indicates a time the first remote packet was received by the base computing system. Aspects of the method includes receiving, from the remote computing system, a second remote packet, wherein a payload of the second remote packet comprises a second send event time indicating a time the first remote packet was sent by the remote computing system and calculating, by the base computing system, a transmission time value based on the first send event time, the second send event time, the first received event time, and the second received event time.

Embodiments also include a method for timing synchronization between a base computing system and a remote computing system. The method includes sending, by the base computing system, to the remote computing system a first base packet, wherein the first base packet is sent at a first send event time. Then, the method includes recording, by the base computing system, the first send event time in a memory. Next, the method includes sending, by the base computing system, to the remote computing system a second base packet, wherein a payload of the base packet comprises instructions for the remote computing system. The method also includes receiving, from the remote computing system, a first remote packet, wherein a payload of the first remote packet comprises a first received time indicating a time the first base packet was received by the remote computing system. The method includes recording, by the base computing system, the first received time in the memory and recording, by the base computing system, a second received time in the memory, wherein the second received time indicates a time the first remote packet was received by the base computing system. Aspects of the method includes receiving, from the remote computing system, a second remote packet, wherein a payload of the second remote packet comprises a second sent time indicating a time the first remote packet was sent by the remote computing system and calculating, by the base computing system, a transmission time value based on the first send event time, the second send event time, the first received event time, and the second received event time.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
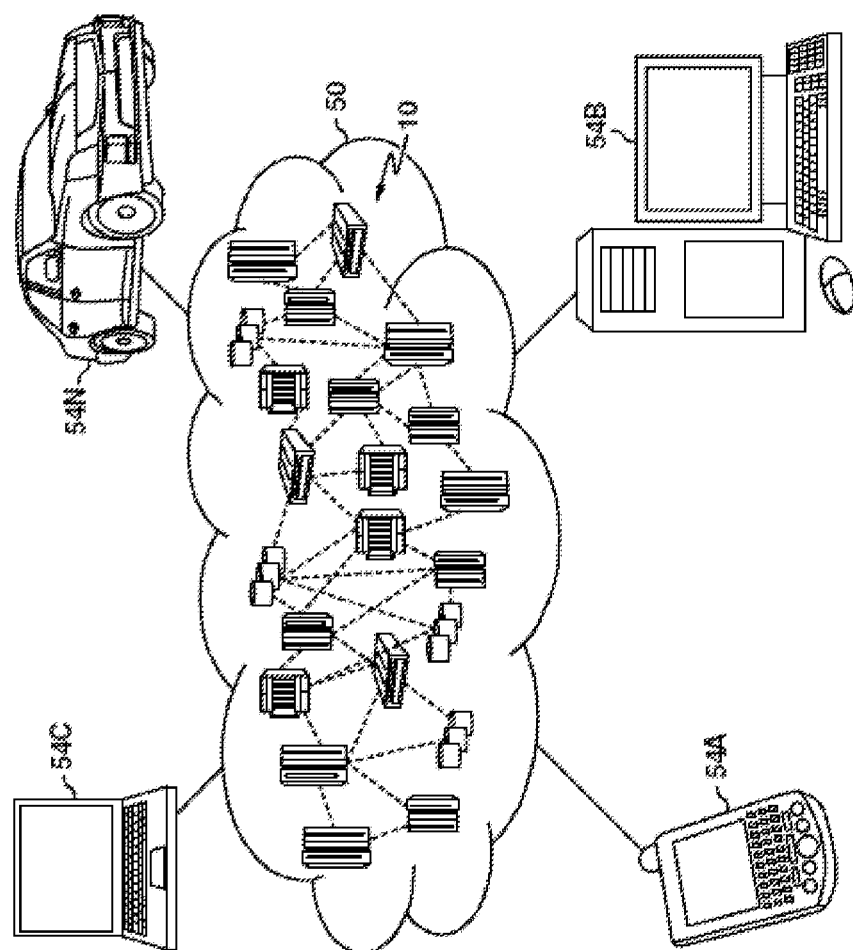
FIG. 1 depicts a cloud computing environment according to an embodiment of the present invention.

In accordance with exemplary embodiments of the disclosure, methods, systems and computer program products for timing synchronization using completion timestamps are provided. Described herein is a method to accomplish timestamp synchronization across systems using virtual functions and Infiniband™ transport. Sysplex™ Time Protocol is intended to keep time synchronized across multiple mainframe computing systems that form the Sysplex™ so that the timestamp across systems is identical. Such synchronization is traditionally complicated because to achieve such identical timestamps it is necessary to compensate for the particular lengths of hardware connections between the computing systems. In one or more embodiments, a standard feature of hardware available to virtual functions is utilized. Accordingly, the hardware will generate a timestamp in the completion queue element (CQE) when a packet is sent over a dedicated queue-pair (QP). The timestamp generated in completion queue (CQ) will be associated with the packet instead of merging the timestamp into the packet.

To synchronize timestamps across remote computing systems, it is necessary to determine the length of the connection. Typically, a local system will encapsulate and transmit the timestamp in an STP packet and send to a remote system. The remote system can then encapsulate and transmit a timestamp in a return STP packet and send back to the local system. The round trip messaging is utilized to determine the "length" of the connection in terms of the transmission time in each direction, as well as determining the difference in the clocks between the two systems. Repeated measurements of the length of the connection are needed to be consistent, so it is important that the timestamps be captured as near to the transmission and reception of the STP packet as possible. The network interface hardware can capture the local timestamps and embed them into the STP packets automatically (e.g., IEEE 1588 Precision Time Protocol). However, in some embodiments, when using single-root input/output virtualization (SR-IOV) on a network adapter, such an operation is available typically for a supervisory physical function. Thus, virtual functions may instead use software to capture and embed the sender timestamp, and on packet reception, capture the receiver timestamp. Using software for these actions introduces variability in the time between capturing the timestamp and the actual time that the packet is sent/received.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
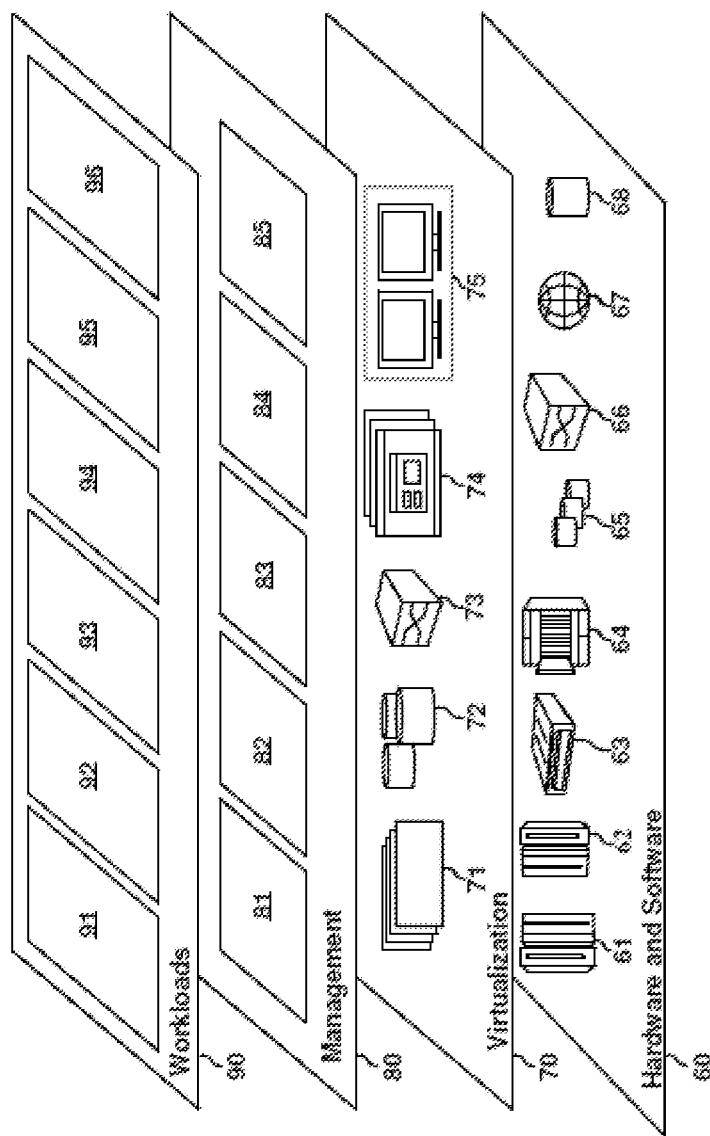
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and timing synchronization between a base computing system and remote computing system 96.

Figure 3:
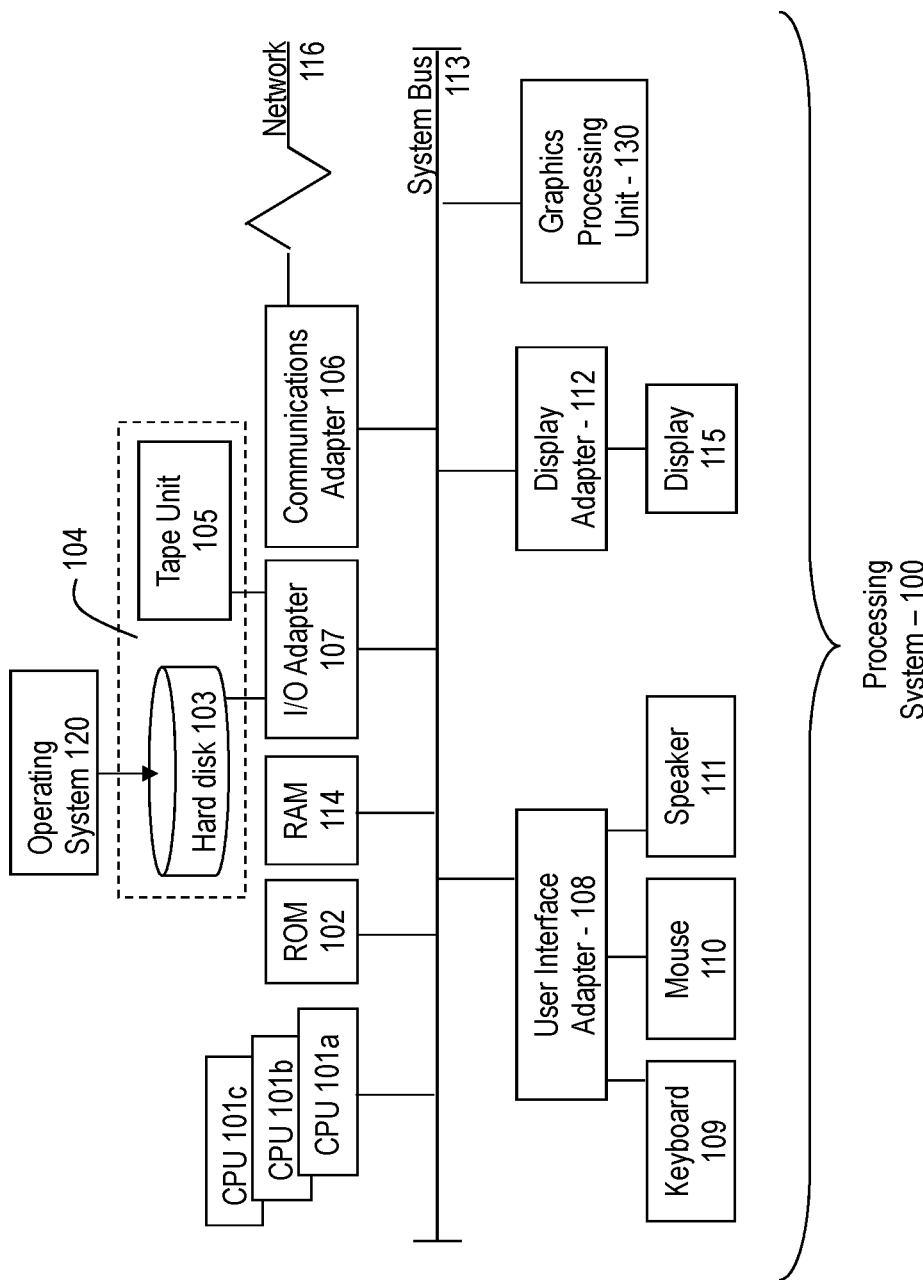
FIG. 3 illustrates a block diagram of a computing system for use in practicing the teachings herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including the system memory 114 and mass storage 104, input means such as keyboard 109 and mouse 110, and output capability including speaker 111 and display 115. In one embodiment, a portion of system memory 114 and mass storage 104 collectively store an operating system coordinate the functions of the various components shown in FIG. 3.

Figure 4:
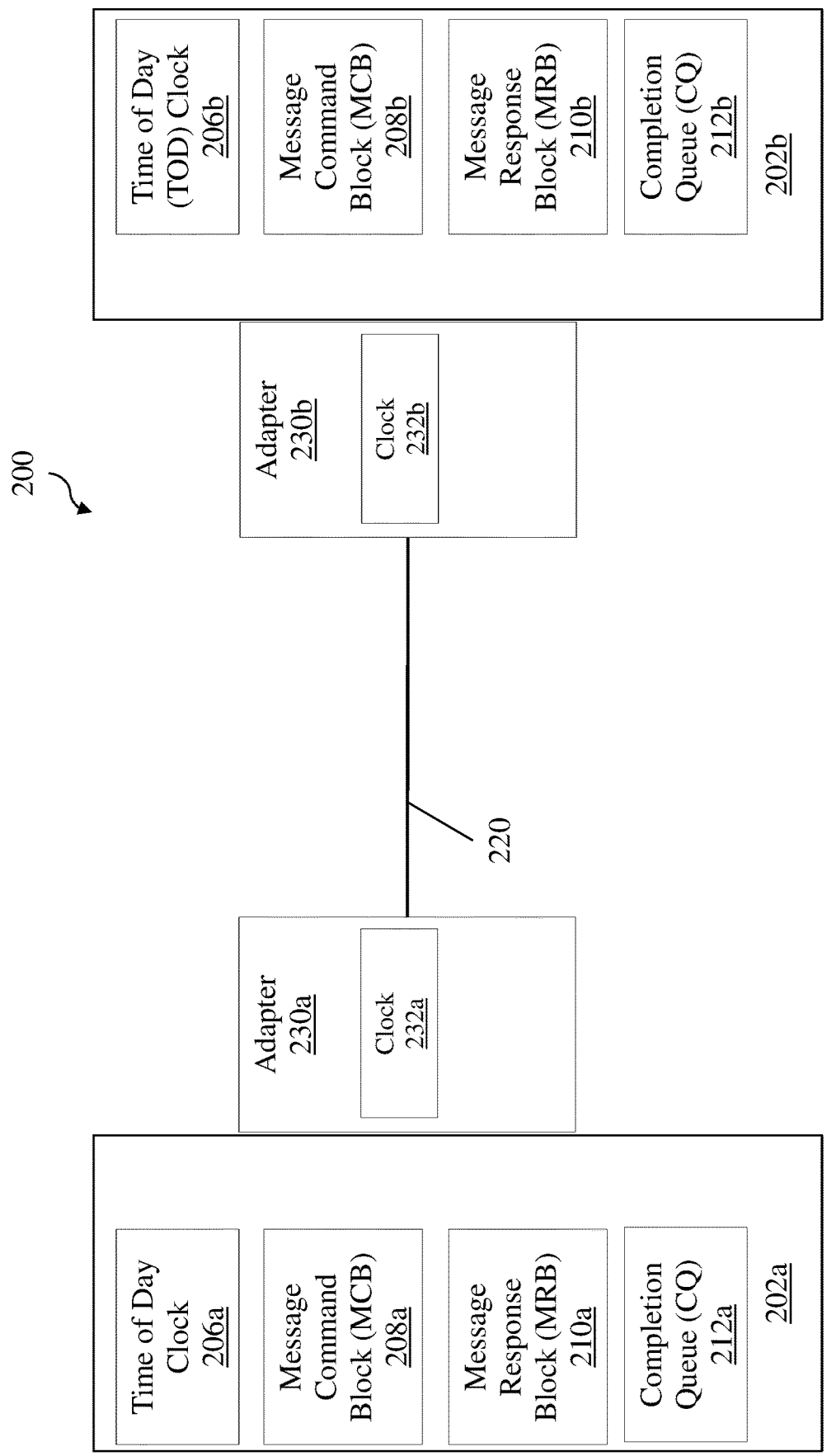
FIG. 4 illustrates a block diagram of a system for timing synchronization in accordance with an embodiment.

Referring to FIG. 4 there is shown a system for timing protocol using completion timestamps according to one or more embodiments. The system 200 includes a base mainframe computing system 202a and a remote mainframe computing system 202b. As shown in FIG. 4, each computing system 202a, 202b includes a time of day (TOD) clock 206a, 206b, a message command block (MCB) 208a, 208b, and a message response block (MRB) 210a, 210b. The two computing systems 202a, 202b are connected together by a point-to-point link 220. The point-to-point link 220 can be any type of connection including but not limited to an Infiniband® connection or a dedicated queue pair (QP). In one or more embodiments, the base mainframe computing system 202a and remote mainframe computing system 202b can be connected via a network connection such as the internet or any other network connection. The connection can be facilitated by a peripheral component interconnect (PCI) bus or any other type of interconnect or adapter such as, for example, PCI Express, conventional PCI, PCI-X, and AGP buses. Each of the computing systems 202a, 202b has an adapter 230a, 230b. With each adapter is a clock 232a, 232b. The adapter clock 232a, 232b can be any type of clock including but not limited to a TOD clock.

The present invention relates to methods and systems for timing protocol using completion timestamps among multiple computers or computing systems, such as computing systems 202a, 202b of the system 200. In one or more embodiments, the timing protocol utilizes four measured time values that are taken at the computing systems 202a, 202b. The base mainframe computing system 202a has the base mainframe computing adapter 230a that sends a first packet over the link 220 to the remote mainframe computing system 202b. The first packet may or may not contain a payload. In the illustrated example, the first packet does not contain a payload and consists of a header. The base mainframe computing adapter 230a will post an entry to Completion Queue 212a indicating the actual time at which the first packet was sent. The base mainframe computing system 202a will save the first send event time (t1). When the first packet arrives at the remote mainframe computing system 202b, the remote mainframe computing system adapter 230b will post an entry to the Completion Queue 212b which contains the actual first received event time (t2). After a period of time has passed, the base mainframe computing adapter 230a will send a follow-on packet to the remote mainframe computing system 202b. The follow-on packet includes the first send event time (t1) in the payload of the follow-on packet. The remote mainframe computing system 202b will receive the follow-on packet and will save the first send event time (t1). A similar action then occurs in the opposite direction with the remote mainframe computing adapter 230b sending a packet to the base mainframe computing system 202a. In this direction, the received event time is stored (t4) in the completion queue 212a for the base mainframe computing system 212a. The remote mainframe computing system 202b will then receive the actual send time of its send packet in the completion queue 212b. The remote mainframe computing system 202b will then send a second packet to the base mainframe computing system 202a, with the actual send time (t3) in the payload of the follow-on packet. When this follow-on packet is received by adapter 230a, the information is placed into the completion queue 212b. Now, with all four data points available on base mainframe computing system 202a, these values (e.g. t1, t2 or t3, t4) are utilized to calculate the transmission delay between two systems. The calculation is $[(t2-t1)+(t4-t3)]/2$.

In one or more embodiments, the calculated transmission delay can be utilized to synchronize the TOD clock 206a of the base mainframe computing system 202a with the TOD clock 206b of the remote mainframe computing system 202b. In one or more embodiments, the timestamps are obtained utilizing a standardized feature of hardware available to virtual functions in the computing systems. The adapters 230a, 230b store the send and receive event times in their respective completion queues (212a, 212b) based on the adapters local clocks 232a, 232b. The hardware is able to record a more precise time when the packets are sent by utilizing the hardware clock. Utilizing a software program to manage recording of the completion event times would add unnecessary delay and variability to the timing information because the software cannot be guaranteed to run at the exact time when a send or receive event occurs.

In one or more embodiments, to accomplish timestamp synchronization between the base mainframe computing system 202a and the remote mainframe computing system 202b, a standardized feature of hardware available to virtual functions is utilized. For example, when a packet is sent over the point to point link 220, (e.g., a dedicated queue-pair (QP)) the hardware will generate—but not merge into the packet—a timestamp in a completion queue element (CQE) associated with that packet and store in the completion queue (CQ) 212a. The transmit-timestamp is sent via a follow-on Sysplex™ timing protocol (STP) packet to the remote computing system 202b. When the first packet that was sent over point-to-point link 220 arrives at the remote system 202b, a CQE is generated by the hardware that contains the receive-timestamp of when the packet was received based upon the adapter clock 232a or 232b, and is stored in the completion queue (CQ) 212b. When the second STP packet arrives at the remote side, the embedded transmit-timestamp is saved.

In one or more embodiment, the system 200 may send the timing packets periodically. For example, a first and second packet may be sent to one or more remote systems sixteen times a second. Based on the times in both directions (t1 through t4), the system 200 can calculate the actual transmission time for one or more packet/follow-on packet pairs. For example, a minimum or threshold number of packet and follow-on packets could be required to calculate the transmission time between two computing systems.

In one or more embodiments, the mechanism for sending and receiving the packets is on an adapter 230a, 230b that contains an adapter clock 232a, 232b, which is separate from the mainframe computing systems (202a and 202b). To synchronize the clocks of the mainframe computing systems, a method to correlate the adapter clocks 232a, 232b with the mainframe TOD-clocks 206a, 206b is needed. To accomplish correlation, the mainframe computing systems read timestamps from both the adaptor TOD clocks 232a, 232b and the mainframe TOD clock 206a, 206b. The conversion between adapter-TOD and mainframe-TOD requires knowing the format of each of the TODs (i.e., the frequency of change for each of the bits). For example, if bit 51 of the mainframe-TOD changes every microsecond, and bit 47 of the adapter-TOD changes every microsecond, then the adapter-TOD can be converted into the adapter-TOD by shifting it right by 4 bits.

Figure 5:
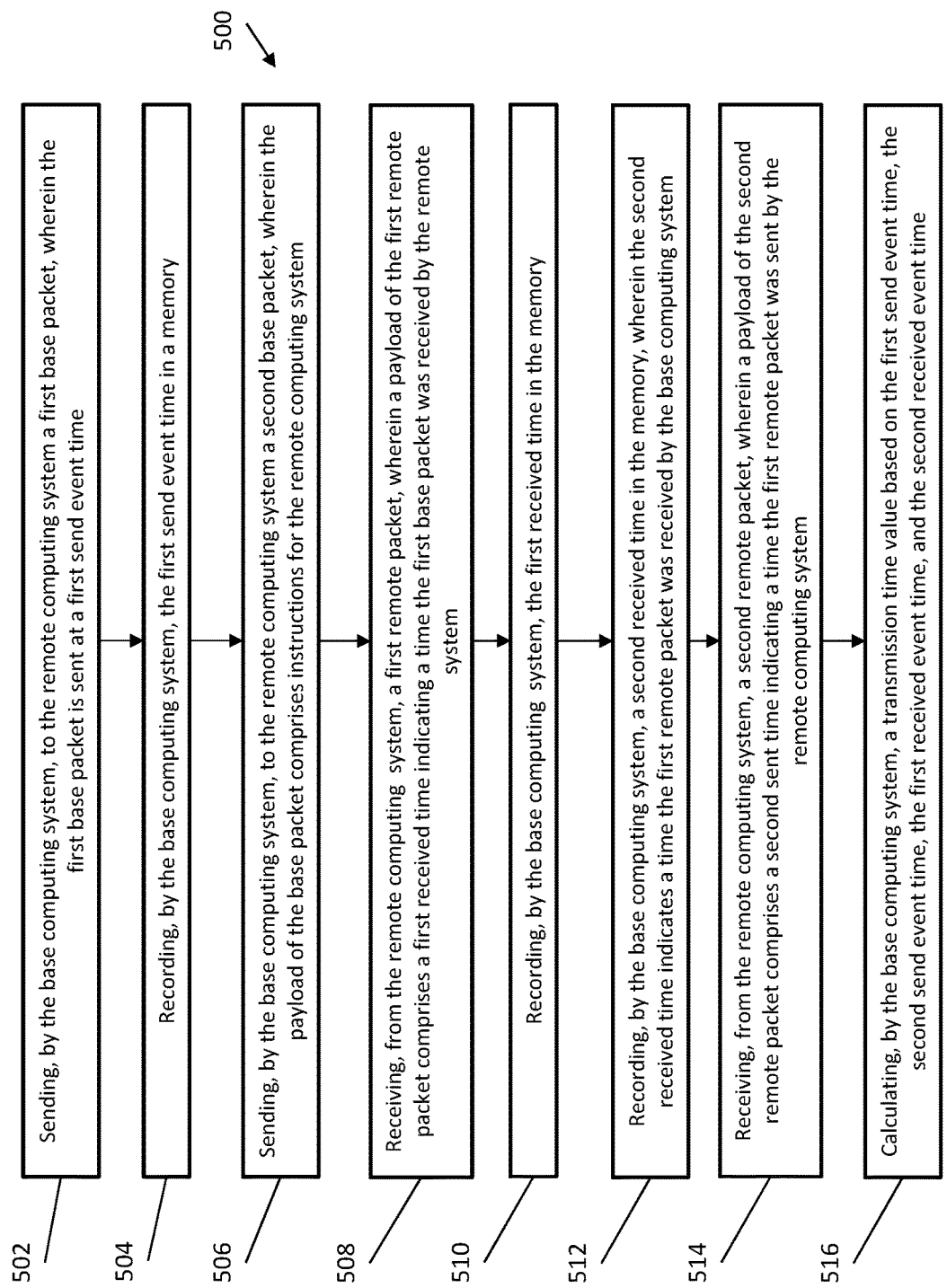
FIG. 5 illustrates a flow diagram of a method for timing synchronization in accordance with an embodiment.

Referring now to FIG. 5 there is shown a flow diagram of a method 500 for a timing protocol using completion timestamps. At block 502, the method 500 includes sending, by the base computing system, to the remote computing system a first base packet, wherein the first base packet is sent at a first send event time. Next, at block 504, the method includes recording, by the base computing system, the first send event time in a memory. The method 500 includes sending, by the base computing system, to the remote computing system a second base packet, wherein a payload of the base packet comprises instructions for the remote computing system, as shown at block 506. At block 508, the method includes receiving, from the remote computing system, a first remote packet, wherein a payload of the first remote packet comprises a first received time indicating a time the first base packet was received by the remote computing system. The method 500 also includes recording, by the base computing system, the first received time in the memory, as shown at block 510. Next, at block 512, the method 500 includes recording, by the base computing system, a second received time in the memory, wherein the second received time indicates a time the first remote packet was received by the base computing system. At block 514, the method 500 includes receiving, from the remote computing system, a second remote packet, wherein a payload of the second remote packet comprises a second sent time indicating a time the first remote packet was sent by the remote computing system. And, at block 516, the method 500 includes calculating, by the base computing system, a transmission time value based on the first send event time, the second send event time, the first received event time, and the second received event time.

Additional processes may also be included. It should be understood that the processes depicted in FIG. 5 represent illustrations, and that other processes may be added or existing processes may be removed, modified, or rearranged without departing from the scope and spirit of the present disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for timing synchronization between a base computing system and a remote computing system, the method comprising:
    sending, by the base computing system, to the remote computing system a first base packet, wherein the first base packet is sent at a first send event time;
        wherein the first base packet comprises a header and no payload;
        wherein the first send event time comprises a first send timestamp generated, by the base computing system, in a first completion queue element associated with the first base packet; and
        wherein the first send event time is logged by a PCI adapter for the base computing system;
    recording, by the base computing system, the first send event time in a memory;
    sending, by the base computing system, to the remote computing system a second base packet, wherein the second base packet comprises a sysplex timing protocol (STP) packet, and wherein a payload of the second base packet comprises instructions for the remote computing system and the first send event time;
    receiving, by the base computing system from the remote computing system, a first remote packet, wherein a payload of the first remote packet comprises a first received event time indicating a time the first base packet was received by the remote computing system; and
        wherein the first received event time comprises a first received timestamp generated, by the remote computing system, in a second completion queue element associated with the first remote packet;
    recording, by the base computing system, the first received event time in the memory;
    recording, by the base computing system, a second received event time in the memory, wherein the second received event time indicates a time the first remote packet was received by the base computing system;
    receiving, by the base computing system from the remote computing system, a second remote packet, wherein a payload of the second remote packet comprises a second send event time indicating a time the first remote packet was sent by the remote computing system; and
    calculating, by the base computing system, a transmission time value based on the first send event time, the second send event time, the first received event time, and the second received event time.

2. The method of claim 1, further comprising:
    analyzing the transmission time value and a time of day clock for the base computing system to determine synchronization instructions for a time of day clock on the remote computing system; and
    sending the synchronization instructions to the remote computing system.

3. The method of claim 1, wherein the first remote packet and the second remote packet are sent based on the instructions for the remote computing system.

4. The method of claim 1, wherein the first base packet and the second base packet are transmitted from the base computing system to the remote computing system through a point to point link.

5. The method of claim 4, wherein the point to point link is a dedicated queue pair link.

6. The method of claim 1, wherein the first base packet and the second base packet are transmitted from the base computing system to the remote computing system through a network connection.

7. The method of claim 1, wherein sending of the first base packet and the second base packet is repeated periodically.

8. The method of claim 1, further comprising:
    calculating, by the base computing system, a transmission distance value based on the first send event time, the second send event time, the first received event time, and the second received event time.

9. A computer system for timing synchronization between a base computing system and a remote computing system, the base computing system including a processor communicatively coupled to a memory, the processor configured to:
    send to the remote computing system a first base packet, wherein the first base packet is sent at a first send event time;
        wherein the first base packet comprises a header and no payload;
        wherein the first send event time comprises a first send timestamp generated, by the base computing system, in a first completion queue element associated with the first base packet; and
        wherein the first send event time is logged by a PCI adapter for the base computing system;
    record the first send event time in the memory;
    send to the remote computing system a second base packet, wherein the second base packet comprises a sysplex timing protocol (STP) packet, and wherein a payload of the second base packet comprises instructions for the remote computing system and the first send event time;
    receive, from the remote computing system, a first remote packet, wherein a payload of the first remote packet comprises a first received event time indicating a time the first base packet was received by the remote computing system; and wherein the first received event time comprises a first received timestamp generated, by the remote computing system, in a second completion queue element associated with the first remote packet;

record the first received event time in the memory;

record a second received event time in the memory, wherein the second received event time indicates a time the first remote packet was received by the base computing system;

receive, from the remote computing system, a second remote packet, wherein a payload of the second remote packet comprises a second send event time indicating a time the first remote packet was sent by the remote computing system; and calculate a transmission time value based on the first send event time, the second send event time, the first received event time, and the second received event time.

10. The computer system of claim 9, wherein the processor is further configured to:

analyze the transmission time value and a time of day clock for the base computing system to determine synchronization instructions for a time of day clock on the remote computing system; and send the synchronization instructions to the remote computing system.

11. The computer system of claim 9, wherein the first remote packet and the second remote packet are sent based on the instructions for the remote computing system.

12. The computer system of claim 9, wherein the first base packet and the second base packet are transmitted from the base system to the remote computing system through a point to point link.

13. The computer system of claim 12, wherein the point to point link is a dedicated queue pair link.

14. The computer system of claim 9, wherein sending of the first base packet and the second base packet is repeated periodically.

15. A computer program product for timing synchronization between a base computing system and a remote computing system, the computer program product comprising a non-transitory computer readable storage medium having program instructions embodied therewith, the program instructions executable by a processor to cause the processor to perform:

sending, by the base computing system, to the remote computing system a first base packet, wherein the first base packet is sent at a first send event time;

wherein the first base packet comprises a header and no payload;

wherein the first send event time comprises a first send timestamp generated, by the base computing system, in a first completion queue element associated with the first base packet; and wherein the first send event time is logged by a PCI adapter for the base computing system;

recording, by the base computing system, the first send event time in a memory;

sending, by the base computing system, to the remote computing system a second base packet, wherein the second base packet comprises a sysplex timing protocol (STP) packet, and wherein a payload of the second base packet comprises instructions for the remote computing system and the first send event time;

receiving, by the base computing system from the remote computing system, a first remote packet, wherein a payload of the first remote packet comprises a first received event time indicating a time the first base packet was received by the remote computing system; and wherein the first received event time comprises a first received timestamp generated, by the remote computing system, in a second completion queue element associated with the first remote packet;

recording, by the base computing system, the first received event time in the memory;

recording, by the base computing system, a second received event time in the memory, wherein the second received event time indicates a time the first remote packet was received by the base computing system;

receiving, by the base computing system from the remote computing system, a second remote packet, wherein a payload of the second remote packet comprises a second send event time indicating a time the first remote packet was sent by the remote computing system; and calculating, by the base computing system, a transmission time value based on the first send event time, the second send event time, the first received event time, and the second received event time.

16. The computer program product of claim 15, further comprising:

analyzing the transmission time value and a time of day clock for the base computing system to determine synchronization instructions for a time of day clock on the remote computing system; and sending the synchronization instructions to the remote computing system.

17. The computer program product of claim 15, wherein the first remote packet and the second remote packet are sent based on the instructions for the remote computing system.

* * * * *